(12) United States Patent
Liu et al.

(10) Patent No.: US 7,712,055 B2
(45) Date of Patent: May 4, 2010

(54) DESIGNING INTEGRATED CIRCUITS FOR YIELD

(75) Inventors: Hongzhou Liu, Pittsburgh, PA (US);
Glen Clark, Wexford, PA (US); Lorenz Neureuter, Pittsburgh, PA (US); Hui Zhang, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 141 days.

(21) Appl. No.: 11/947,737

(22) Filed: Nov. 29, 2007

(65) Prior Publication Data

US 2009/0144671 A1    Jun. 4, 2009

(51) Int. Cl.
*G06F 17/50* (2006.01)
*G06F 9/45* (2006.01)

(52) U.S. Cl. ................. 716/2; 716/3; 716/4; 716/7

(58) Field of Classification Search ......... 716/2, 716/3, 4, 7
See application file for complete search history.

(56) References Cited

U.S. PATENT DOCUMENTS

| | | | |
|---|---|---|---|
| 6,606,729 B2 * | 8/2003 | Gross et al. ............. | 716/1 |
| 6,757,873 B2 * | 6/2004 | Yamaguchi ............. | 716/2 |
| 7,493,574 B2 | 2/2009 | Liu et al. | |
| 2004/0073879 A1 * | 4/2004 | Chen et al. ............. | 716/8 |
| 2005/0257178 A1 * | 11/2005 | Daems et al. ........... | 716/2 |
| 2007/0180411 A1 * | 8/2007 | Swegat et al. .......... | 716/4 |
| 2008/0195359 A1 | 8/2008 | Barker et al. | |

FOREIGN PATENT DOCUMENTS

| | | |
|---|---|---|
| WO | 2007005724 A2 | 1/2007 |
| WO | 2007005724 A3 | 1/2007 |

OTHER PUBLICATIONS

Hongzhou Liu, Lorenz Neureuter, Hui Zhang; Cadence, Design for Yield Algorithm Experiment Report, A Proposed DFY Flow Handling a Large Number of Environment Variables; May 31, 2007.
Hongzhou Liu, Rodney Phelps; Cadence, Design for Yield (DFY) in Analog Circuit Design; Cadence Technical Conference 2005.
Kevin S Eshbaugh, Member, IEEE; Generation of Correlated Parameters for Statistical Circuit Simulation; IEEE Transactions on Computer-Aided Design, vol. 11, No. 10, Oct. 992; 0278-0070/92$03.00 1992 IEEE.
European Search Report, Application No. EP 08 25 2875, Dated Feb. 23, 2009 , 8 pages.
Gerhard Rappitsch et al; Experimental Verification of Simulation based Yield Optimization for Power-On Reset Cells; Conference 2006, IEEE Custom Integrated Circuits, IEEE, Piscataway, NJ, USA, Sep. 1, 2006 (Sep. 1, 2006), pp. 857-860, XP031052599, ISBN: 978-1-4244-0075-1, *pp. 857-860*.

(Continued)

*Primary Examiner*—Stacy A Whitmore
*Assistant Examiner*—Magid Y Dimyan
(74) *Attorney, Agent, or Firm*—Sawyer Law Group, P.C.

(57) ABSTRACT

Method and system for designing integrated circuits for yield are described. Integrated circuits are designed for yield by finding worst yield corners based on design, statistical, and environmental variables and optimizing the design in light of the worst yield corners found.

21 Claims, 7 Drawing Sheets

OTHER PUBLICATIONS

Sinha D et al; Statistical Gate Sizing for Timing Yield Optimization; Computer-Aided Design, 2005. ICCAD-2005. IEEE/ACM International Confer ENCE on Nov. 6-10, 2005, Piscataway, NJ, USA, IEEE, Nov. 6, 2005 (Nov. 6, 2005), pp. 1037-1042, XP010865141, ISBN: 978-0-780-9254-0, *p. 1034 p. 1037*.

Datta A et al; A Statistical Approach to Area-Constrained Yield Enhancement for Pipelined Circuits Under Parameter Variations, Test Symposium, 2005. Proceedings. 14TH Asian Calcutta, India Dec. 18-21, 2005, Piscataway, NJ, USA, IEEE, Dec. 18, 2005 (Dec. 18, 2005), pp. 170-175, XP010877916, ISBN: 978-0-7695-2481-8, *pp. 171-174*.

Sinha et al; Statistical Timing Yield Optimization by Gate Sizing; IEEE Transactions on Very Large Scale Integration (VLSI) Systems, IEEE Service Center, Piscataway, NJ, US, vol. 14, No. 10, Oct. 2006 (Oct. 1, 2006), pp. 1140-1146, XP011142367, ISSN: 1063-8210, *pp. 1142-1144*.

Datta A et al; Speed Binning Aware Design Methodology to Improve Profit Under Parameter Variations; Design Automation, 2006. Asia and South Pacific Conference on Jan. 24, 2006, Piscataway, NJ, USA, IEEE, Jan. 24, 2006 (Jan. 24, 2006), pp. 712-717, XP010901157, ISBN: 978-0-7803-9451-3, *pp. 712-714*.

Antreich K J et al; Circuit Analysis and Optimization Driven by Worst-Case Distances; IEEE Transactions on Computer Aided Design of Integrated Circuits and Systems, IEEE Service Center, Piscataway, NJ, US, vol. 13, No. 1, Jan. 1, 1994 (Jan. 1, 1994), pp. 57-71, XP000452166, ISSN: 0278-0070, *pp. 58-60*.

Antreich K et al; WiCkeD: Analog Circuit Synthesis Incorporating Mismatch; Proceedings of the IEEE 2000 Custom Integrated Circuits Conference (Cat. No. 00CH37044) IEEE Piscataway, NJ, USA, 2000, pp. 511-514, XP002514256, ISBN: 0-7803-5809-0, *pp. 512-513*.

Cadence, Neocircuit Users Guide; Product Version 3.4, Feb. 2007; 2001-2007 Cadence Design Systems, Inc. and Neolinear, Inc. Cover - p. 112.

Cadence, Neocircuit Users Guide; Product Version 3.4, Feb. 2007; 2001-2007 Cadence Design Systems, Inc. and Neolinear, Inc. pp. 113-232.

Cadence, Neocircuit Users Guide; Product Version 3.4, Feb. 2007; 2001-2007 Cadence Design Systems, Inc. and Neolinear, Inc. pp. 233-337.

* cited by examiner

DESIGNING INTEGRATED CIRCUITS FOR YIELD

BACKGROUND

Yield, in relation to an integrated circuit (IC) design, is a percentage of integrated circuits manufactured based on the integrated circuit design that satisfy, for instance, performance requirements, functional specifications, or the like. Hence, profitability of integrated circuit products is directly related to integrated circuit design yield.

Various factors may affect yield of integrated circuit designs. For example, environmental variables (e.g., temperature changes, power supply changes, etc.), manufacturing variables (also referred to as process or statistical variables), or the like, can affect yield of integrated circuit designs. Designing integrated circuits for yield is becoming more important as circuit sizes decrease, performance requirements increase, and so forth.

SUMMARY

A method of designing integrated circuits for yield is described. In one implementation, the method provides for preparing an integrated circuit design based on a set of one or more performance requirements, analyzing the integrated circuit design to find one or more worst yield corners in the integrated circuit design based on at least one environmental variable and at least one statistical variable, simulating each worst yield corner to determine whether the worst yield corner satisfies the set of one or more performance requirements, and processing the integrated circuit design further to finalize the integrated circuit design responsive to each worst yield corner satisfying the set of one or more performance requirements.

A system for designing integrated circuits for yield is also described. In one implementation, the system provides for a design module that prepares an integrated circuit design based on a set of one or more performance requirements, an analysis module that is in communication with the design module and analyzes the integrated circuit design to find one or more worst yield corners in the integrated circuit design based on at least one environmental variable and at least one statistical variable, and a simulation module that is in communication with the design module and the analysis module, and simulates each worst yield corner to determine whether the worst yield corner satisfies the set of one or more performance requirements, wherein responsive to each worst yield corner satisfying the set of one or more performance requirements, the design module processes the integrated circuit design further to finalize the integrated circuit design.

DETAILED DESCRIPTION

This disclosure generally relates to designing integrated circuits for yield. The following description is provided in the context of a patent application and its requirements. Accordingly, this disclosure is not intended to be limited to the implementations shown, but is to be accorded the widest scope consistent with the principles and features described herein.

Integrated circuit design involves various tasks, such as topology selection, sizing, layout planning, and so forth. Topology selection is the task of choosing an interconnection of circuit components and devices to implement a desired function. Sizing is the task of choosing sizes (e.g., length, width, etc.) for different components/devices of a circuit, as well as the circuit itself. Various methodologies can be used to size an integrated circuit.

Figure 1:
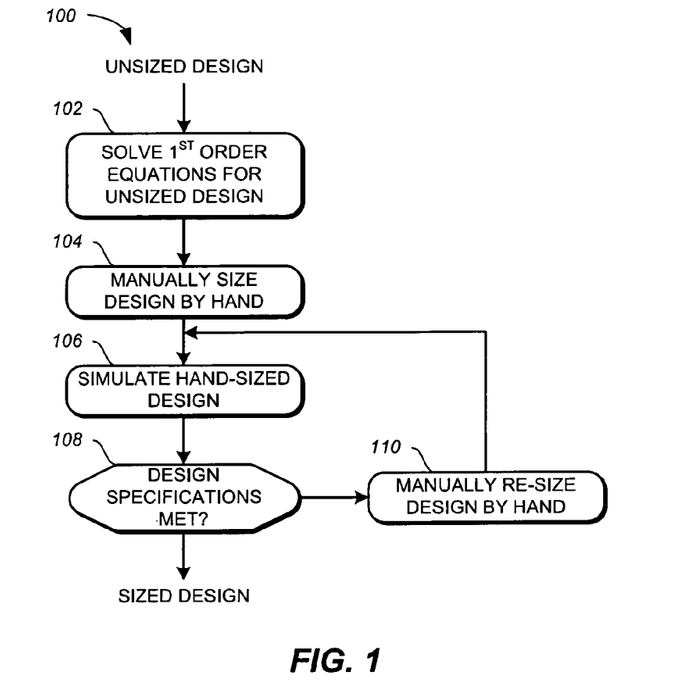
FIGS. 1-2 depict different sample processes for sizing integrated circuit designs.
Figure 2:
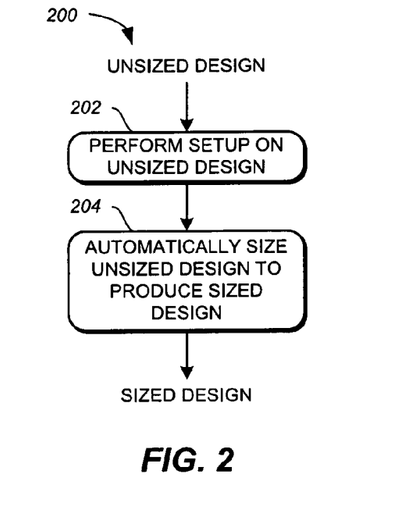

Depicted in FIG. 1-2 are different processes 100-200 for sizing integrated circuits. In FIG. 1, first-order equations (e.g., first order derivatives) are solved at 102 for a circuit design that has not been sized. Based on solutions found for the first-order equations, the circuit design is manually sized by hand at 104. Simulation is then performed on the manually sized circuit design at 106.

At 108, results of the simulation are analyzed to determine whether performance requirements/functional specifications of the circuit design have been met. If the requirements/specifications have not been met, the circuit design is manually resized by hand at 110 and process 100 returns to process block 106 to simulate the re-sized circuit design. However, if the requirements/specifications have been met, the sized circuit design is outputted.

Figure 3:
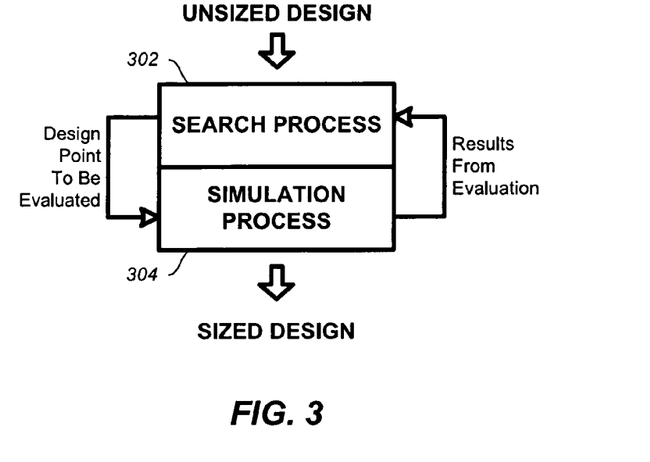
FIG. 3 illustrates a sample automatic integrated circuit design sizing process.

With process 200 in FIG. 2, setup is performed on an unsized circuit design at 202 and automatic sizing is performed at 204 to produce a sized circuit design. FIG. 3 illustrates a sample automatic sizing process 300 with a search process 302 and a simulation process 304. Automatic sizing process 300 is an optimization-based system that uses numerical techniques to search a defined design space.

Figure 4:
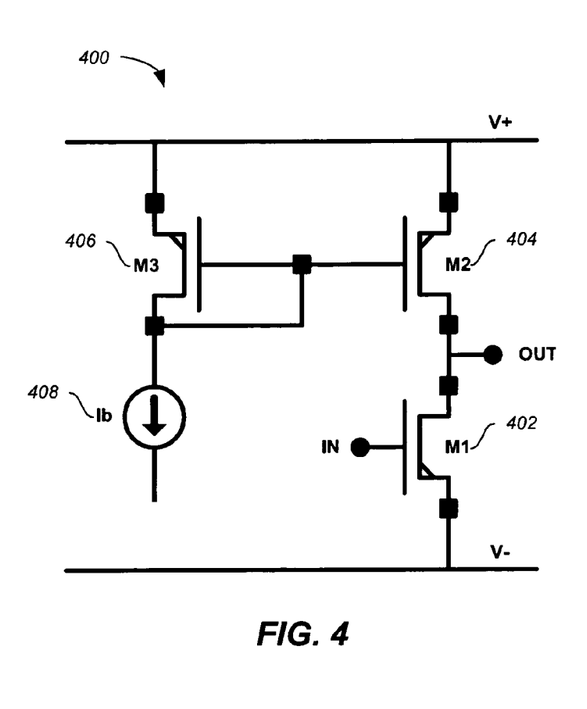
FIG. 4 shows a sample integrated circuit design.

A design space typically includes a plurality of design points. A design point is a particular set of component/device sizes for a circuit. To explain design points and design spaces, a sample integrated circuit design 400 with transistors M1, M2, and M3 402-406 and a current source Ib 408 is shown in FIG. 4. For purposes of simplicity, assume that transistors 402-406 in sample circuit 400 only have two parameters of interest: width (W) and length (L).

Let $x1=\{1\mu, 2\mu, \ldots, 100\mu\}$ and $x2=\{5\mu, 6\mu, \ldots, 500\mu\}$, where $1\mu$ is equal to $1\times10^{-6}$ meters In addition, suppose Ib=x1, M1.L=M2.L=M3.L=$1\mu$, and M1.W=M2.W=M3.W=x2. In the example, there are two independent design variables, x1 and x2. Hence, a design point is a particular set of $\{x1, x2\}$ values. Examples of design points include $\{1\mu, 5\mu\}, \ldots, \{100\mu, 500\mu\}$. Search process 302 in FIG. 3 can iteratively set values for design variables x1 and x2. Each design point can then be evaluated through simulation process 304.

The design space for sample integrated circuit design 400 is the set of all design points. In the example, the design space is:

{x1, x2} = {{1μ, 5μ}, {1μ, 6μ}, ... , {1μ, 500μ}, {2μ, 5μ}, {2μ, 6μ},

... , {2μ, 500μ}, ... {100μ, 5μ}, {100μ, 6μ}, ... , {100μ, 500μ}}

Unlike sample integrated circuit design 400 in FIG. 4, design spaces for typical integrated circuit designs may contain trillions of design points. This means that the design space cannot be effectively explored using exhaustive search to evaluate each design point. Hence, an intelligent search process is necessary to find a design point that meets performance requirements, functional specifications, etc., and is optimal in terms of area, power, and/or other measures of merit.

Selection of optimal values for design variables, however, also has to take into account manufacturing variables (also referred to as process variables or statistical variables). In particular, because of manufacturing imperfections (e.g., masking imperfections) during fabrication of integrated circuits, properties of manufactured circuits may vary from one another. Process variables may be within a circuit (also referred to as mismatch or intra-die) or between circuits (also referred to as global or inter-die). As a result, actual performance of circuits manufactured based on a design may be different from simulated performance of the design.

Environmental variables, such as temperature changes, power supply changes, or the like, also needs to be taken into consideration when sizing circuit designs. Specifically, a circuit should be able to operate according to specified performance requirements, functional specifications, and so forth, regardless of the environment in which the circuit is operating. Thus, both statistical and environmental variables may result in yield problems.

In relation to integrated circuit designs, yield is a percentage of integrated circuits manufactured in accordance with an integrated circuit design that satisfy certain conditions, such as functionality, performance (e.g., resistance value, speed, etc.), or the like. Since profitability of integrated circuit products is directly related to yield of integrated circuit designs, integrated circuit design yield is important. Designing integrated circuits for yield has become even more important as circuit sizes decrease, performance requirements increase, and so forth.

Figure 5:
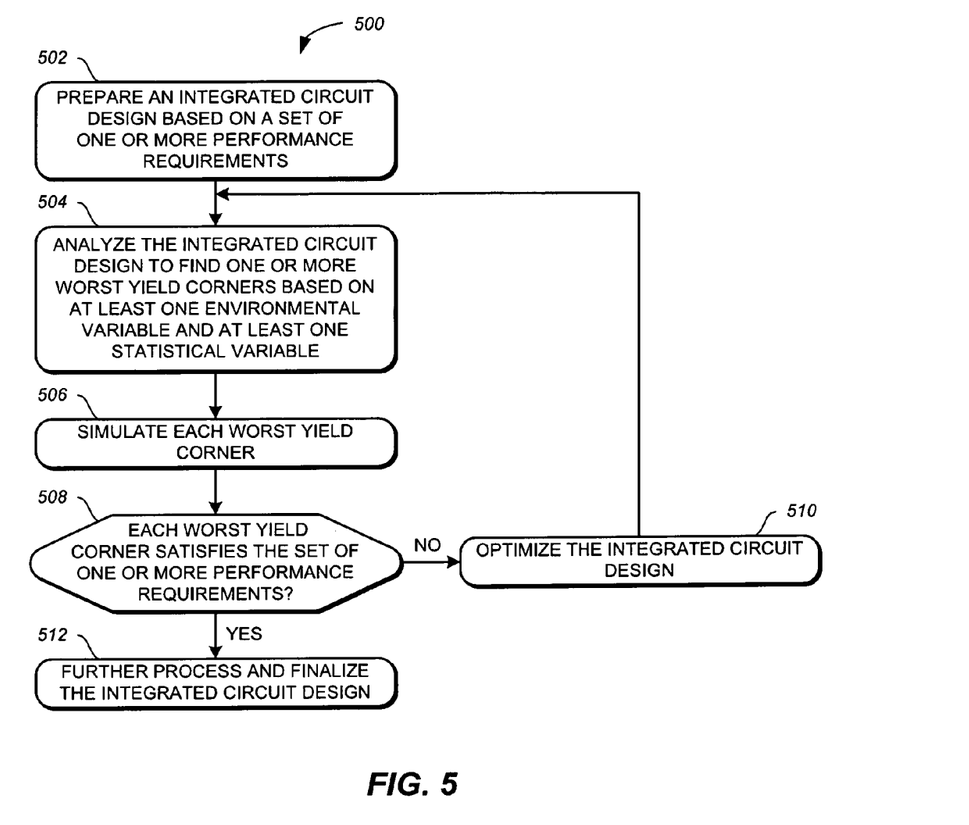
FIG. 5 depicts a process of designing integrated circuits for yield according to an implementation.

FIG. 5 depicts a process 500 of designing integrated circuits for yield according to an implementation. At 502, an integrated circuit design is prepared based on a set of one or more performance requirements. Preparation of the integrated circuit design may only be up to topology selection.

However, preparation of the integrated circuit design may include setting up one or more design constraints and one or more design specifications. Design constraints include, for instance, design variable selection, range settings, or the like. Design specifications include, for instance, circuit performance, targets, or the like. Initial optimization may include selecting a first set of one or more design variable values (e.g., a design point). Selection of the first set of one or more design variable values may be based on assuming nominal (e.g., average, median, default, etc.) values for any statistical or environmental variables.

At 504, the integrated circuit design is analyzed to find one or more worst yield corners in the integrated circuit design based on at least one environmental variable and at least one statistical variable. Hence, both environmental and statistical variables are taken into consideration in finding each worst yield corner. This should lead to a higher yield design because worst corners found based solely on environmental variables or based solely on statistical variables may not be the worst corners in terms of yield.

In one implementation, analysis of the integrated circuit design includes performing sensitivity analysis on each of a plurality of environmental variables to reduce a number of environmental variables to be analyzed in conjunction with the integrated circuit design. Sensitivity analysis can be used to determine which environmental variables will have more effect on performance. As a result, there will no longer be a need to enumerate every possible combination of environmental variables. This should help reduce processing time.

Each worst yield corner found is simulated at 506 using a circuit simulator, such as Spectre, Hspice, or the like. Results from the simulation are then used to determine whether each worst yield corner satisfies the set of one or more performance requirements at 508. Determining whether each worst yield corner satisfies the set of one or more performance requirements may involve selecting one or more design points and running simulations across the worst yield corer.

If it is determined that at least one worst yield corner fails to satisfy the set of one or more performance requirements, then, at 510, the integrated circuit design is optimized. Optimization of the integrated circuit design may include selecting different values for one or more design variables (e.g., different design point). Process 500 returns to process block 504 to analyze the optimized integrated circuit design.

However, if it is determined that every worst yield corner found satisfies the set of one or more performance requirements, then the integrated circuit design is further processed and finalized at 512. For example, sizing of the integrated circuit design can be finalized using values assigned to design variables. Layout selection can also be performed.

Figure 6:
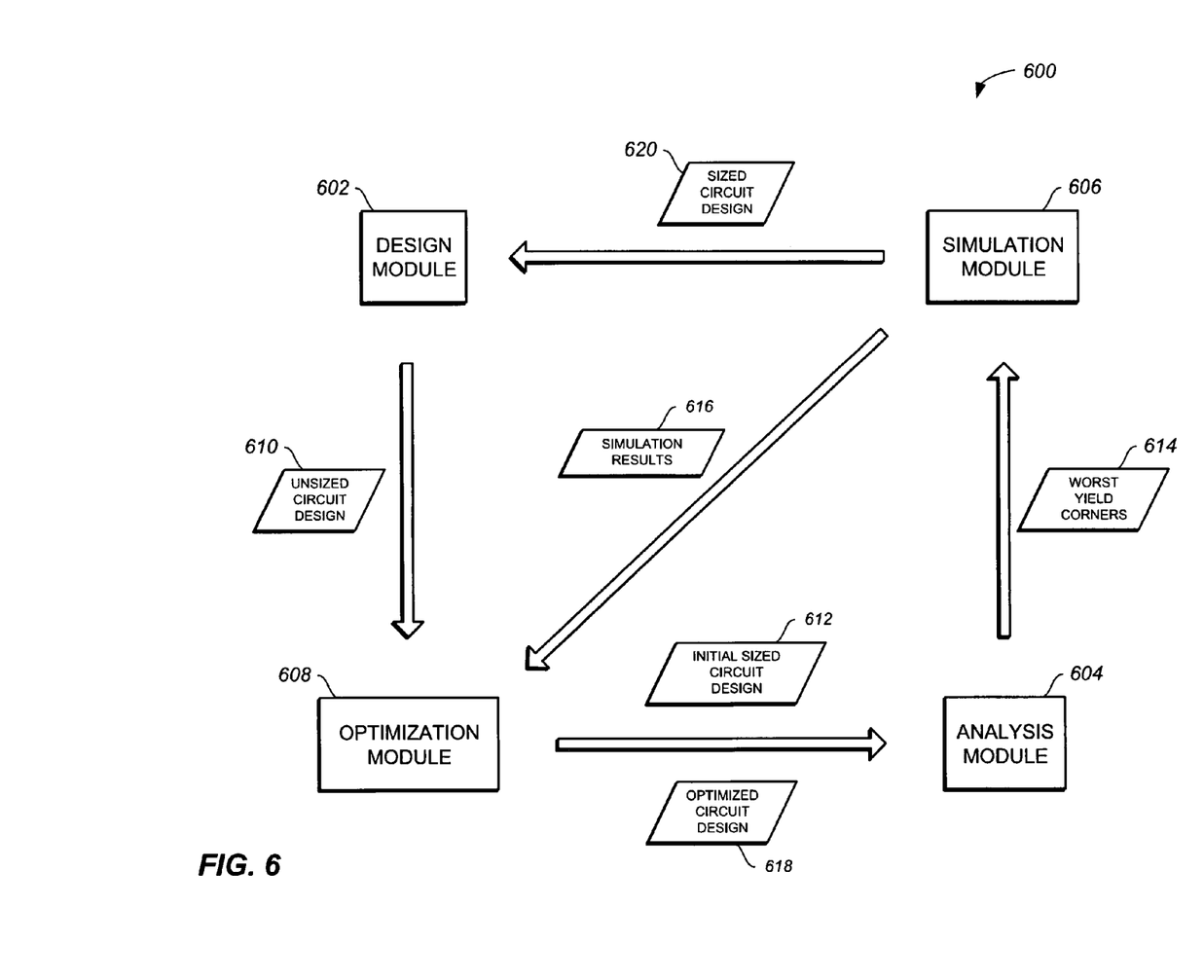
FIG. 6 illustrates a system for designing integrated circuits for yield according to an implementation.

Illustrated in FIG. 6 is a system 600 for designing integrated circuits for yield according to an implementation. System 600 includes a design module 602, an analysis module 604, a simulation module 606, and an optimization module 608. Design module 602 prepares an integrated circuit design 610 based on a set of one or more performance requirements. Integrated circuit design 610 prepared by design module 602 is unsized.

Optimization module 608 prepares an initial sized circuit design 612 for unsized circuit design 610. Analysis module 604 then analyzes initial sized circuit design 612 prepared by optimization module 608 to find one or more worst yield corners 614 in the integrated circuit design based on at least one environmental variable and at least one statistical variable. Simulation module 606 then simulates each worst yield corner 614 found by analysis module 604 to determine whether each worst yield corner 614 satisfies the set of one or more performance requirements.

If at least one worst yield corner 614 fails to satisfy the set of one or more performance requirements, then optimization module 608 optimizes initial sized circuit design 612 based on simulation results 616 from simulation module 606 to create an optimized integrated circuit design 618. Worst yield corners 614 may also be taken into account when creating optimized integrated circuit design 618. Optimized integrated circuit design 618 is then analyzed by analysis module 604 for worst yield corners.

Simulation module 606 simulates each worst yield corner found in optimized integrated circuit design 618 by analysis module 604. When optimized integrated circuit design 618 still includes at least one worst yield corner that does not satisfy the set of one or more performance requirements, then optimization, analysis, and simulation are conducted again. This continues until all worst yield corners satisfy the set of one or more performance requirements. Once all worst yield corners satisfy the set of one or more performance requirements, a sized circuit design 620 is further processed and finalized by design module 602.

Although not illustrated in FIG. 6, system 600 may include other modules. In addition, modules 602-608 can be combined into fewer modules or even a single module. Further, each of module 602-608 may include other sub-modules (not shown).

Worst yield corners can be found as follows. In the following example, a linear sensitivity analysis is used to identify worst yield corner. Assume there is a linear relationship between performance requirements and environmental variables. In addition, assume environmental variables are independent. By assuming there is a linear relationship between performance requirements and environmental variables, only first order derivatives will need to be considered. By assuming environmental variables are independent, there will be no need to consider combination of derivatives.

The first assumption can be verified by performing a linear monotonic check. If linear monotonic check fails between performance requirements and environmental variables, then simple linear sensitivity analysis can be extended to a quadratic model. This may require more samples to generate models. Even though only first order equations are described below, other order equations (e.g., second order derivatives) may be employed as well.

Suppose design variables are represented by a vector of real numbers, $d \in \mathbb{R}^{n_d}$, where $n_d$ is a number of design variables. For example, design variables can be presented as <W1, L1, W2, L2, . . . >. Also, suppose statistical variables are represented by a vector of real numbers, $s \in \mathbb{R}^{n_d}$, where $n_s$ is a number of statistical variables. For example, statistical variables can be presented as <process_tox, mismatch_tox_M1, mismatch_tox_M2, . . . >.

In addition, suppose environmental variables are represented by a vector of real numbers, $e \in \mathbb{R}^{m_e}$, where $n_f$ is a number of environmental variables. For example, environmental variables can be presented as <temp, vdd, Cload, . . . >. Suppose performance requirements are further represented by a vector of real numbers, $f \in \mathbb{R}^{n_f}$, where $n_f$ is a number of performance requirements. For example, performance requirements can be presented as <Gain, Phasemargin, . . . >. Circuit variables can then be represented as $v=[d^T s^T e^T]$. As a result, circuit simulation process takes 3 vectors as input and generates one performance vector as output, $[d^T s^T e^T] \rightarrow f$.

Integrated circuit design yield can be defined using Monte Carlo simulation to find the boundary of an integrated circuit design (e.g., worst corner of a design based solely on statistical variations). Monte Carlo simulation is a method often used to find solutions to mathematical problems with many variables, which cannot be easily solved by integral calculus or other numerical methods.

Figure 7A:
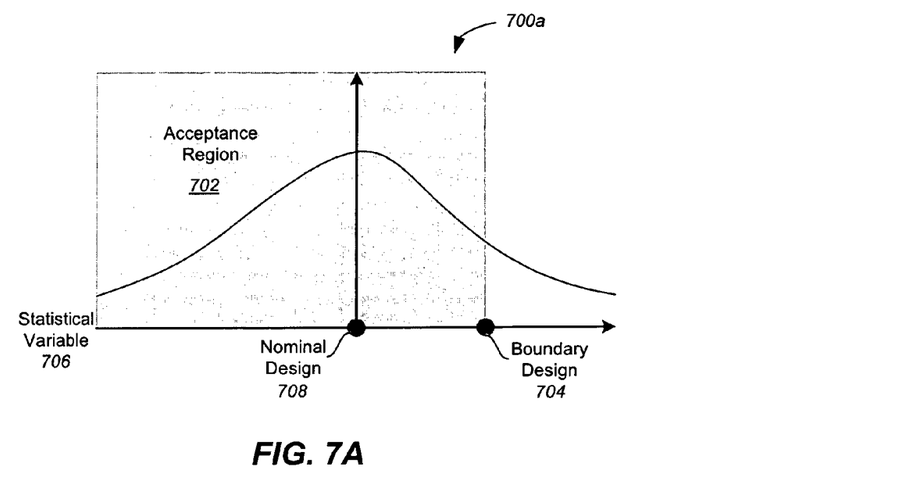
FIGS. 7A-7B show sample graphical representations of how integrated circuit design yield is affected by statistical and environmental variables.
Figure 7B:
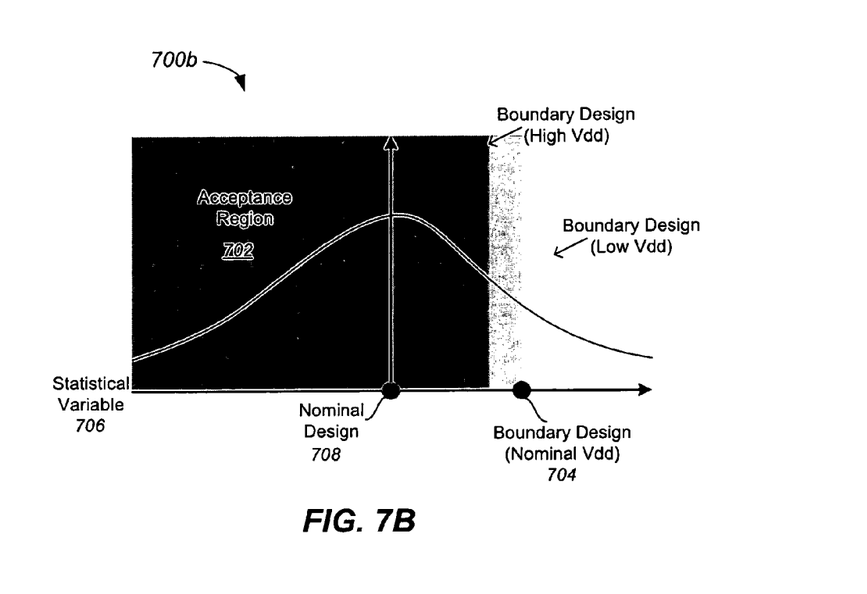

FIGS. 7A-7B show sample graphs 700a and 700b. In graph 700a, an acceptance region 702 for an integrated circuit design is defined based on a boundary 704 of the integrated circuit design in terms of statistical variables 706. Graph 700a also shows integrated circuit yield when nominal values 708 are selected for statistical variables 706. The area of acceptance region 702 is equal to the integrated circuit design yield.

Variations in environmental variables, however, will result in movement of boundary 704. This will lead to changes in acceptance region 702 and, as a result, the integrated circuit yield. Boundary 704, which is in terms of statistical variables 706, may not actually be the worst in terms of yield because environmental variables are all set to nominal (e.g., average, default, median, or the like) values.

Graph 700b shows how an environmental variable (Vdd) affects acceptance region 702 and, therefore, yield. As shown in graph 700b, boundary 704 is moved to the left when Vdd is high and moved to the right when Vdd is low. Consequently, the worst integrated circuit yield actually occurs when Vdd is high.

In light of the above, a worst yield corner can be found using the following equations:

$$f \in \mathbb{R}^{n_f}, f = f_0(d_0, s_w, e_0) + \nabla_e f^T \times (e - e_0)$$

$$f_w = f_0(d_0, s_w, e_0) + \frac{\partial f}{\partial e_{(1)}} \times (e_{(1)w} - e_{(1)0}) + \frac{\partial f}{\partial e_{(2)}} \times (e_{(2)w} - e_{(2)0}) + \ldots$$

$$e_{(i)L} \leq e_{(i)w} \leq e_{(i)H}$$

The variable $f_w$ represents a performance requirement vector that will lead to the worst yield possible. The variable $s_w$ represents a statistical variable vector that will lead to the worst yield possible. The variable $e_{(i)w}$ represents a value of an i-the environmental variable that will lead to the worst yield possible where the value is less than or equal to a highest possible value for that variable and greater than or equal to a lowest possible value for that variable. Any variable with subscript '0' represents a nominal value or a vector with nominal values for that variable.

Below is an example of how the above formulas can be used to find a worst yield corner. Suppose for the example that temperature is the only environmental variable and gain is the only performance requirement. Design variables are represented by $d \in \mathbb{R}^{n_d}$, statistical variables are represented by $s \in \mathbb{R}^{n_s}$, the environmental variable is represented by e=Temperature, where $Temperature_L$=-40° C., $Temperature_0$=27° C., and $Temperature_H$=125° C., and circuit variables are represented by $\eta=[d^T s^T Temperature]$. Circuit performance can then be expressed as $[d^T s^T Temperature] \rightarrow f$=Gain. As a result, $$f_w = Gain_w = Gain_0(d_0, s_w, Temp_0) + \nabla_{Temp} Gain \times (Temp_w - Temp_0)$$

$$Gain_w = Gain_0(d_0, s_w, 27°C.) + \frac{\partial Gain}{\partial Temp} \times (Temp_w - 27°C.)$$

The above equations show the relation of the Gain performance requirement as a function of circuit variables. Monte Carlo simulation can be used to find the statistical variable vector $s_w$. Sensitivity analysis can then be performed on $s_w$ to find $Temp_w$. The combination of $s_w$ and $e_w$ ($Temp_w$ in the example) is the worst yield corner, which can be included in circuit optimization.

Figure 8:
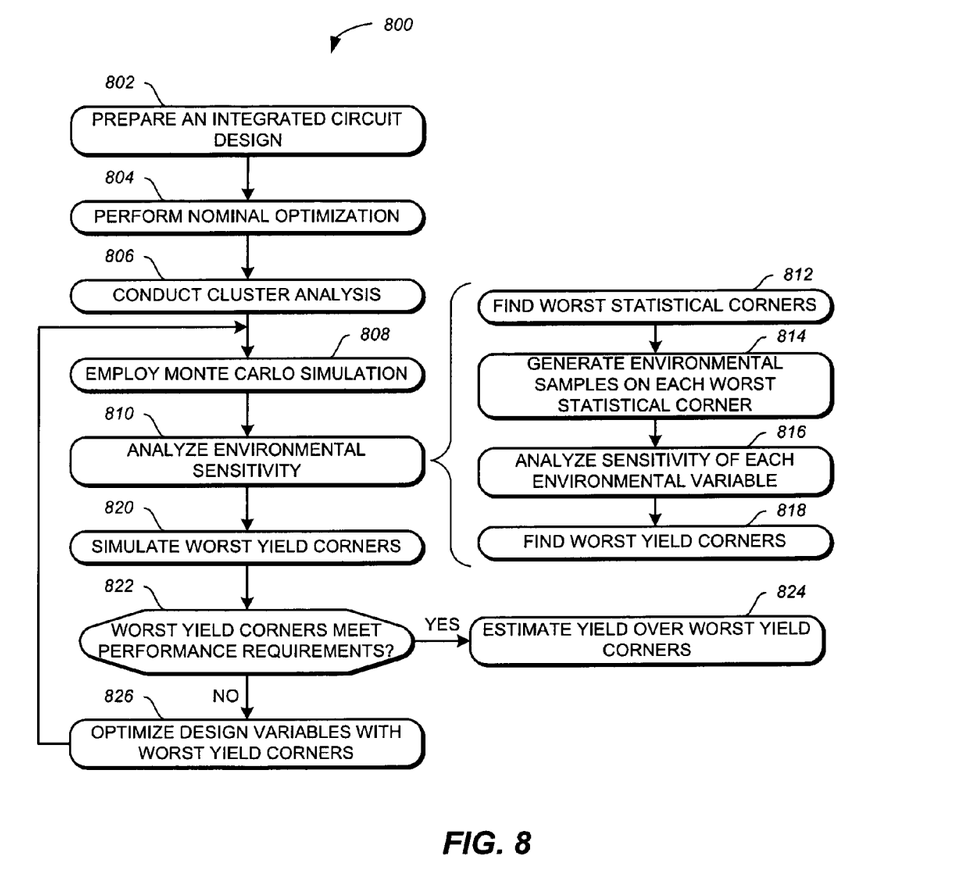
FIG. 8 depicts a process of designing integrated circuits for yield according to an implementation.

Depicted in FIG. 8 is a process 800 of designing integrated circuits for yield according to an implementation. At 802, an integrated circuit design is prepared. Preparation of the integrated circuit design may involve, for instance, choosing a circuit topology, identifying a set of design variables to optimize, determining a range for each design variable identified, setting performance requirements for the circuit, and so forth.

Range of design variables, such as length, width, resistance, capacitance, and so forth, may be the minimum and maximum values possible for each design variable. Examples of performance requirements include power consumption, speed (e.g., clock rate), gain, phase margin, and so forth of an integrated circuit.

Nominal optimization is performed at 804 to obtain one or more sets of nominal design variable values (e.g., design points). In other words, without considering any process or environmental variables, design points that will satisfy all performance requirements of the integrated circuit design are gathered.

At 806, cluster analysis is conducted on design points collected during nominal optimization to identify those design points most likely to produce higher yield. Monte Carlo simulation is then employed at 808 to estimate yield of the integrated circuit design based on a design point identified during cluster analysis and taking into account statistical variables. Hence, the boundary of the integrated circuit design based on statistical variables can be found.

In one implementation, cluster analysis involves normalizing each design variable value to a predetermined range (e.g., between 0 and 1), selecting a plurality of clusters for analysis, estimating a center for each cluster selected based on a number of design points in the cluster, assigning each design point to one of the plurality of clusters based on proximity of the design point to the center of the one cluster, computing a center for each cluster using design points assigned to the cluster, and determining whether the computed center for each cluster is within a predefined margin of the estimated center for the cluster.

When the computed center for each cluster is within the predefined margin of the estimated center for the cluster, the computed center of the largest cluster can be used in the Monte Carlo simulation. On the other hand, if the computed center for at least one cluster is not within the predefined margin of the estimated center for the at least one cluster, then a new center is estimated for the at least one cluster, design points are assigned based on the new estimated center, and a new center is computed for the at least one cluster. This continues until the computed center for every cluster is within a predefined margin of the estimated center for the respective cluster.

At 810, environmental sensitivity of the integrated circuit design is analyzed to find worst yield corners in the integrated circuit design. In the implementation, environmental sensitivity analysis involves finding worst statistical corners at 812 based on the Monte Carlo simulation at 808. Environmental samples are then generated for each worst statistical corner at 814.

Sensitivity of each environmental variable is analyzed at 816 to identify environmental variables likely to affect yield. Worst yield corners for the integrated circuit design are then found at 818 based on the environmental variables identified. At 820, the worst yield corners found are simulated. A determination is made at 822 as to whether each worst yield corner meets all performance requirements.

If all performance requirements are met by every worst yield corner found, then a yield is estimated for each worst yield corner at 824. However, if at least one worst yield corner fails to meet all performance requirements, design variables are optimized at 826 and process 800 returns to 808.

The worst yield corner approach works even when the number of environmental variables is large. For example, given N number of environmental variables, enumerating all combinational corners requires $3^N$ number of samples. However, with the worst yield corner approach based on linear sensitivity analysis, only 2*N samples are needed. In addition, the worst yield corner approach should require less circuit simulations than worst corners based solely on environmental variables or based solely on process variables because those worst corners may not represent the worst corners for yield.

This disclosure can take the form of an entirely hardware implementation, an entirely software implementation, or an implementation containing both hardware and software elements. In one implementation, this disclosure is implemented in software, which includes, but is not limited to, application software, firmware, resident software, microcode, etc.

Furthermore, this disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 9:
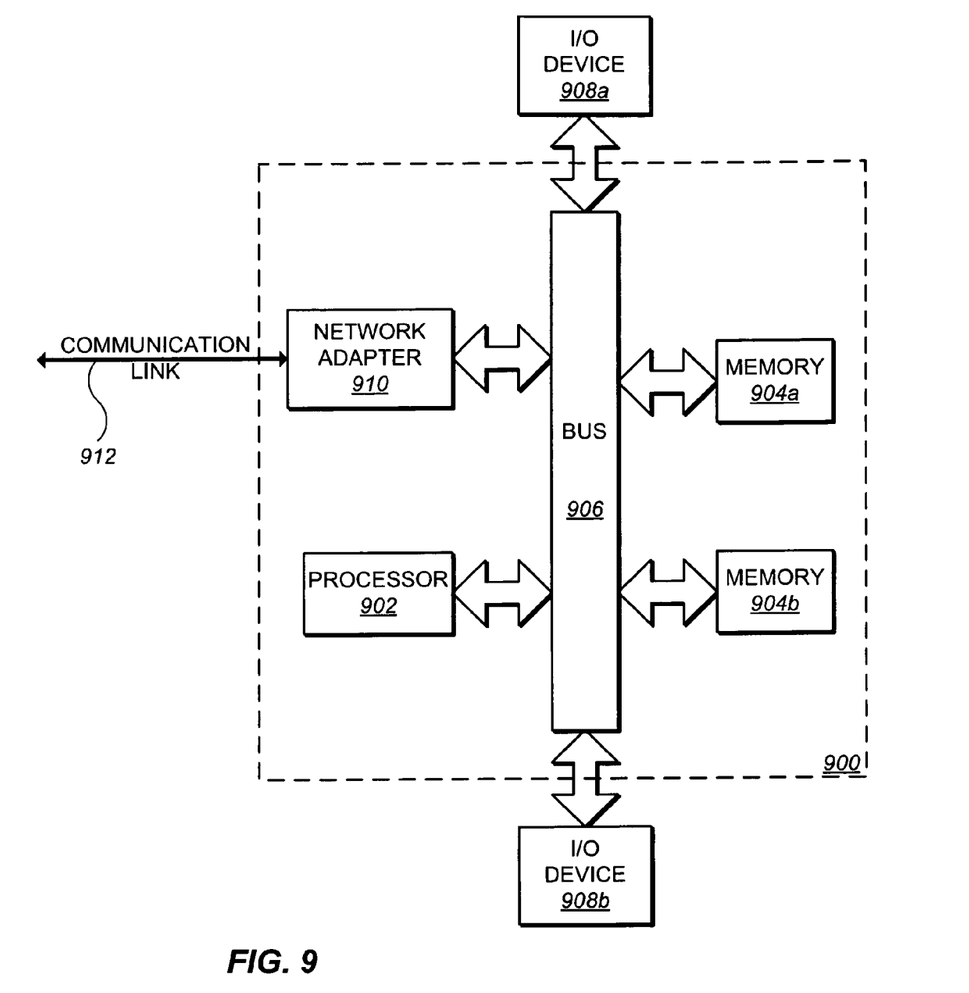
FIG. 9 is a block diagram of a data processing system with which various implementations can be implemented.

FIG. 9 depicts a data processing system 900 suitable for storing and/or executing program code. Data processing system 900 includes a processor 902 coupled to memory elements 904a-b through a system bus 906. In other implementations, data processing system 900 may include more than one processor and each processor may be coupled directly or indirectly to one or more memory elements through a system bus.

Memory elements 904a-b can include local memory employed during actual execution of the program code, bulk storage, and cache memories that provide temporary storage of at least some program code in order to reduce the number of times the code must be retrieved from bulk storage during execution. As shown, input/output or I/O devices 908a-b (including, but not limited to, keyboards, displays, pointing devices, etc.) are coupled to data processing system 900. I/O devices 908a-b may be coupled to data processing system 900 directly or indirectly through intervening I/O controllers (not shown).

In the implementation, a network adapter 910 is coupled to data processing system 900 to enable data processing system 900 to become coupled to other data processing systems or remote printers or storage devices through communication link 912. Communication link 912 can be a private or public network. Modems, cable modems, and Ethernet cards are just a few of the currently available types of network adapters.

While various implementations for designing integrated circuits for yield have been described, the technical scope of this disclosure is not limited thereto. For example, this disclosure is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of this disclosure.

The invention claimed is:

1. A computer-implemented method of designing integrated circuits for yield, wherein the computer performs the following functions:
   preparing an integrated circuit design based on a set of one or more performance requirements;
   analyzing the integrated circuit design to find one or more worst yield corners in the integrated circuit design based on at least one environmental variable and at least one statistical variable; wherein the worst yield corners are constructed from identified environmental variables likely to affect yield based upon an environmental sensitivity analysis,
   simulating each worst yield corner to determine whether the worst yield corner satisfies the set of one or more performance requirements; and
   responsive to each worst yield corner satisfying the set of one or more performance requirements, processing the integrated circuit design further to finalize the integrated circuit design.

2. The computer-implemented method of claim 1, wherein preparing the integrated circuit design comprises:
   setting up one or more design constraints and one or more design specifications; and
   identifying one or more design points for the integrated circuit design, each design point comprising a set of one or more design variable values that satisfy the set of one or more performance requirements.

3. The computer-implemented method of claim 2, wherein identification of the one or more design points is based on an assumption of nominal values for all statistical and environmental variables.

4. The computer-implemented method of claim 2, further comprising:
   conducting cluster analysis on the one or more design points identified for the integrated circuit design to select one design point for analysis; and
   employing Monte Carlo simulation on the one design point selected for analysis to locate a boundary of the integrated circuit design.

5. The computer-implemented method of claim 1, wherein analyzing the integrated circuit design comprises:
   performing sensitivity analysis on each of a plurality of environmental variables to reduce a total number of environmental variables to be analyzed in conjunction with the integrated circuit design.

6. The computer-implemented method of claim 1, wherein analyzing the integrated circuit design comprises:
   finding one or more worst statistical corners of the integrated circuit design; and
   generating one or more environmental samples on each worst statistical corner of the integrated circuit design.

7. The computer-implemented method of claim 1, wherein simulating each worst yield corner comprises:
   selecting a design point for the integrated circuit design, the design point comprising a value for each design variable of the integrated circuit design; and
   simulating the selected design point across each worst yield corner to determine whether the worst yield corner satisfies the set of one or more performance requirements.

8. The computer-implemented method of claim 1, wherein responsive to at least one worst yield corner failing to satisfy the set of one or more performance requirements, the method further comprises:
   optimizing, analyzing, and simulating the integrated circuit design until each worst yield corner satisfies the set of one or more performance requirements.

9. The computer-implemented method of claim 8, wherein optimizing the integrated circuit design comprises:
   selecting a different design point for the integrated circuit design, the different design point comprising a different value for at least one design variable of the integrated circuit design.

10. The method of claim 1, wherein the worst yield corner is found using the following equations:

$$f \in \mathbb{R}^{n_f}, f = f_0(d_0, s_w, e_0) + \nabla_e f^T \times (e - e_0)$$

$$f_w = f_0(d_0, s_w, e_0) + \frac{\partial f}{\partial e_{(1)}} \times (e_{(1)w} - e_{(1)0}) + \frac{\partial f}{\partial e_{(2)}} \times (e_{(2)w} - e_{(2)0}) + \ldots$$

$$e_{(i)L} \leq e_{(i)w} \leq e_{(i)H}$$

wherein the variable $f_w$ represents a performance requirement vector that will lead to the worst yield possible; wherein the variable $s_w$, represents a statistical variable vector that will lead to the worst yield possible; and wherein the variable $e_{(i)w}$ represents a value of an i-the environmental variable that will lead to the worst yield possible where the value is less than or equal to a highest possible value for that variable and greater than or equal to a lowest possible value for that variable, and wherein any variable with subscript '0' represents a nominal value or a vector with nominal values for that variable.

11. A system for designing integrated circuits for yield, the system comprising:
   a design module preparing an integrated circuit design based on a set of one or more performance requirements;
   an analysis module in communication with the design module, the analysis module analyzing the integrated circuit design to find one or more worst yield corners in the integrated circuit design based on at least one environmental variable and at least one statistical variable; wherein the worst yield corners are constructed from identified environmental variables likely to affect yield based upon an environmental sensitivity analysis; and
   a simulation module in communication with the design module and the analysis module, the simulation module simulating each worst yield corner to determine whether the worst yield corner satisfies the set of one or more performance requirements,
   wherein responsive to each worst yield corner satisfying the set of one or more performance requirements, the design module processes the integrated circuit design further to finalize the integrated circuit design.

12. The system of claim 11, wherein the design module prepares the integrated circuit design by:
   setting up one or more design constraints and one or more design specifications; and
   identifying one or more design points for the integrated circuit design, each design point comprising a set of one or more design variable values that satisfy the set of one or more performance requirements.

13. The system of claim 12, wherein identification of the one or more design points is based on an assumption of nominal values for all statistical and environmental variables.

14. The system of claim 12, wherein the analysis module further:

conducts cluster analysis on the one or more design points identified for the integrated circuit design to select one design point for analysis.

15. The system of claim 14, wherein the simulation module further:
employs Monte Carlo simulation on the one design point selected for analysis to locate a boundary of the integrated circuit design.

16. The system of claim 11, wherein the analysis module analyzes the integrated circuit design by:
performing sensitivity analysis on each of a plurality of environmental variables to reduce a total number of environmental variables to be analyzed in conjunction with the integrated circuit design.

17. The system of claim 11, wherein the analysis module analyzes the integrated circuit design by:
finding one or more worst statistical corners of the integrated circuit design; and
generating one or more environmental samples on each worst statistical corner of the integrated circuit design.

18. The system of claim 11, wherein the simulation module simulates each worst yield corner by:
selecting a design point for the integrated circuit design, the design point comprising a value for each design variable of the integrated circuit design; and
simulating the selected design point across each worst yield corner to determine whether the worst yield corner satisfies the set of one or more performance requirements.

19. The system of claim 11, further comprising:
an optimization module in communication with the analysis module and the simulation module, the optimization module optimizing the integrated circuit design responsive to at least one worst yield corner failing to satisfy the set of one or more performance requirements.

20. The system of claim 19, wherein the optimization module optimizes the integrated circuit design by:
selecting a different design point for the integrated circuit design, the different design point comprising a different value for at least one design variable of the integrated circuit design.

21. The system of claim 11, wherein the worst yield corner is found using the following equations:

$$f \in \mathbb{R}^{n_f}, f = f_0(d_0, s_w, e_0) + \nabla_e f^T \times (e - e_0)$$

$$f_w = f_0(d_0, s_w, e_0) + \frac{\partial f}{\partial e_{(1)}} \times (e_{(1)w} - e_{(1)0}) + \frac{\partial f}{\partial e_{(2)}} \times (e_{(2)w} - e_{(2)0}) + \ldots$$

$$e_{(i)L} \leq e_{(i)w} \leq e_{(i)H}$$

wherein the variable $f_w$ represents a performance requirement vector that will lead to the worst yield possible; wherein the variable $s_w$ represents a statistical variable vector that will lead to the worst yield possible; and wherein the variable $e_{(i)w}$ represents a value of an i-the environmental variable that will lead to the worst yield possible where the value is less than or equal to a highest possible value for that variable and greater than or equal to a lowest possible value for that variable, and wherein any variable with subscript '0' represents a nominal value or a vector with nominal values for that variable.

* * * * *